United States Patent
Saito et al.

[11] Patent Number: 6,032,529
[45] Date of Patent: Mar. 7, 2000

[54] LIQUID LEVEL SENSOR FOR BUFFERED HYDROFLUORIC ACID

[75] Inventors: Kyoko Saito, Tsukuba; Hisashi Fujimoto, Ibaraki-Ken; Hideaki Seto, Tsukuba; Haruhiko Yamamoto, Tsukuba; Nobuyoshi Sato, Tsukuba, all of Japan

[73] Assignee: LSI Logic Corporation, Milpitas, Calif.

[21] Appl. No.: 09/322,191

[22] Filed: May 28, 1999

[30] Foreign Application Priority Data

May 29, 1998 [JP] Japan .................................. 10-150090

[51] Int. Cl.[7] .................................................. G01F 23/00
[52] U.S. Cl. .................................................. 73/299; 73/756
[58] Field of Search .......................... 73/299, 301, 19.05, 73/700, 756, 300; 340/614; 374/125

[56] References Cited

U.S. PATENT DOCUMENTS

| | | | |
|---|---|---|---|
| 2,956,581 | 10/1960 | Pearson | 137/391 |
| 4,625,548 | 12/1986 | Charter | 73/299 |
| 5,005,408 | 4/1991 | Glassey | 73/301 |
| 5,599,105 | 2/1997 | Ridley et al. | 374/125 |
| 5,636,547 | 6/1997 | Raj et al. | 73/299 |
| 5,661,228 | 8/1997 | Young | 73/299 |
| 5,802,910 | 9/1998 | Krahn et al. | 73/299 |

*Primary Examiner*—Hezron Williams
*Assistant Examiner*—Thuy Vinh Tran
*Attorney, Agent, or Firm*—Beyer & Weaver, LLP

[57] ABSTRACT

An object of the present invention is to prevent erroneous operation of a liquid level sensor due to deposition of ammonium fluoride dissolved in buffered hydrofluoric acid used as a process solution.

The present invention provides a liquid level sensor comprising a chemical solution bath for receiving a chemical solution including buffered hydrofluoric acid, a gas feed tube for introducing a gas for detecting the variation in the liquid level of said chemical solution into said chemical solution, and a gas pressure detector for detecting a change in the pressure of said gas and converting it into an electric signal to indicate a change in liquid level, characterized in that the diameter of a gas outlet provided at an end of said gas feed tube is smaller than the inner diameter of said gas feed tube.

11 Claims, 5 Drawing Sheets

6,032,529

LIQUID LEVEL SENSOR FOR BUFFERED HYDROFLUORIC ACID

CLAIM OF FOREIGN PRIORITY UNDER 35 U.S.C. §119

This patent application claims priority under 35 U.S.C. section 119 to Japanese Patent Application No. 150090/98, filed on May 29, 1998, which is incorporated herein by reference in its entirety.

BACKGROUND OF THE INVENTION

The present invention relates to a liquid level sensor for detecting the liquid level in a chemical solution processing bath used for wet processes during manufacturing processes of semiconductors or liquid crystals or the like.

Manufacturing processes of semiconductors or liquid crystals involve wet processes such as wafer cleaning, wet etching, etc. Chemical solution baths of wet processing systems are equipped with various types of sensors to detect their liquid level.

For example, Japanese Patent Application No. 204206/94 describes a liquid level sensor in which a chemical solution bath 3 for processing semiconductor wafers 2 with a chemical solution is fed with air or $N_2$ gas at a constant flow rate through a gas feed tube 6, as shown in FIG. 1. An end of the gas feed tube 6 is immersed in the chemical solution 1 to determine the liquid level based on the variation of the pressure of $N_2$ or air reflecting the liquid level. Any pressure difference is detected by an air sensor 5 to deliver an electric signal, according to which a control means 4 controls the liquid level in the chemical solution bath 3 or the like. Thus, the liquid level sensor for wet processes serves to control the operation of the system by feeding air or $N_2$ gas at a constant flow rate, detecting the pressure by the air sensor 5 and converting it into an electric signal to indicate the normal level during supply of the chemical solution to the chemical solution bath 3, or the lower limit level during discharging.

The liquid level sensor should operate precisely in wet process systems, because it sometimes serves to stabilize the process by detecting(g any drop in liquid level due to evaporation of the chemical solution to deliver a signal for adding the chemical solution. However, the above liquid level sensor sometimes erroneously operates when deposits 8 are formed on the inner wall of the end of the gas feed tube 6 from a process solution, such as ammonium fluoride ($NH_4F$) dissolved in buffered hydrofluoric acid (HF: $NH_4F$= 1:5 to 1:500), or surfactant-added buffered hydrofluoric acid or pure water-added buffered hydrofluoric acid, or the like (hereinafter collectively referred to as buffered hydrofluoric acid), as shown in FIG. 2.

This can be explained as follows. If $N_2$ is used as a gas, $N_2$ gas 9 is flowed out from the end of the gas feed tube 6 in the form of bubbles into the chemical solution 1. As $N_2$ gas 9 is released from the end of the gas feed tube 6, trace amounts of buffered hydrofluoric acid are deposited on the inner wall of the gas feed tube 6 and dried with high-purity $N_2$ gas free from moisture so that ammonium fluoride dissolved in buffered hydrofluoric acid separates out. Thus, ammonium fluoride particles gradually grow up to finally block the gas feed tube 6. When the gas feed tube 6 is blocked by deposition of ammonium fluoride, $N_2$ gas pressure rises so that the sensor 5 erroneously operates to send a signal indicative of a rise in liquid level to the wet system, which in return triggers an alarm, though the liquid level is normal.

In order to restart the wet system, ammonium fluoride deposits in the gas feed tube 6 must be removed. However, the removal operation requires that still usable buffered hydrofluoric acid be discharged because it is dangerous to remove the deposits while retaining the chemical solution 1 in the chemical solution bath 3.

In view of the above problems, the present invention aims to provide a liquid level sensor free from the erroneous operation as described above by preventing deposition of ammonium fluoride or the like.

SUMMARY OF THE INVENTION

In order to overcome the above problems, samples of several shapes of the tube end of a liquid level sensor were prepared and tested. It was found that a sample with a reduced-diameter tube end portion could effectively restrain deposition of ammonium fluoride.

Accordingly, a liquid level sensor for buffered hydrofluoric acid in accordance with the present invention includes a chemical solution bath for receiving a chemical solution including buffered hydrofluoric acid, a gas feed tube for introducing a gas for detecting the variation in the liquid level of said chemical solution into said chemical solution, and a gas pressure detector for detecting a change in the pressure of said gas and converting it into an electric signal to indicate a change in liquid level, and it is characterized in that the diameter of a gas outlet provided at an end of said gas feed tube is smaller than the inner diameter of said gas feed tube.

DETAILED DESCRIPTION OF PREFERRED EMBODIMENTS

Reference will now be made in detail to preferred embodiments of the invention. Examples of the preferred embodiments are illustrated in the accompanying drawings. While the invention will be described in conjunction with these preferred embodiments, it will be understood that it is not intended to limit the invention to one or more preferred embodiments. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

A liquid level sensor for buffered hydrofluoric acid according to the present invention can be suitably used for detecting the liquid level of chemical solutions including buffered hydrofluoric acid ($HF:NH_4F=1:5$ to $1:500$), surfactant-added buffered hydrofluoric acid, pure water-added buffered hydrofluoric acid, etc.

Suitable gases for detecting the variation in liquid level include inert gases such as $N_2$ gas, air or Ar or the like.

In a liquid level sensor according to the present invention, an end portion of the gas feed tube may have any shape provided that the diameter of the gas outlet at the end portion of the gas feed tube is smaller than the inner diameter of the gas feed tube.

Figure 1:
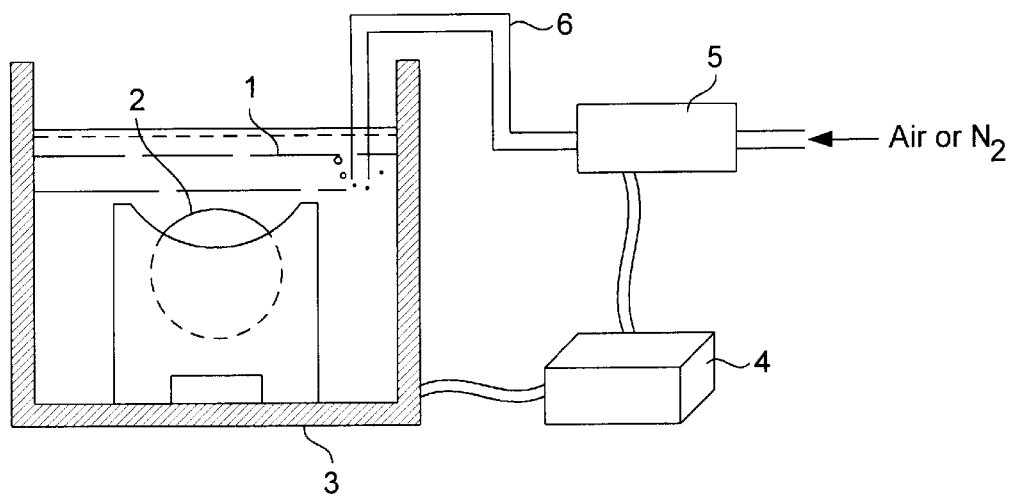
FIG. 1 is a block diagram showing a conventional chemical solution processing system.
Figure 2:
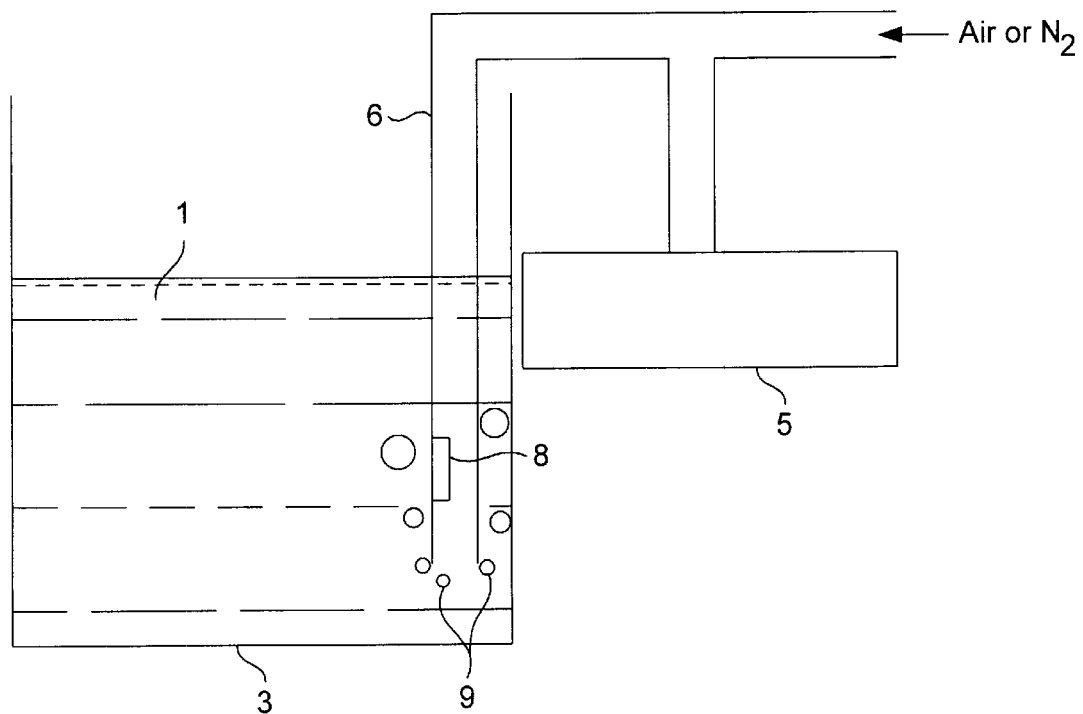
FIG. 2 is a schematic view showing a conventional chemical solution processing system.
Figure 3:
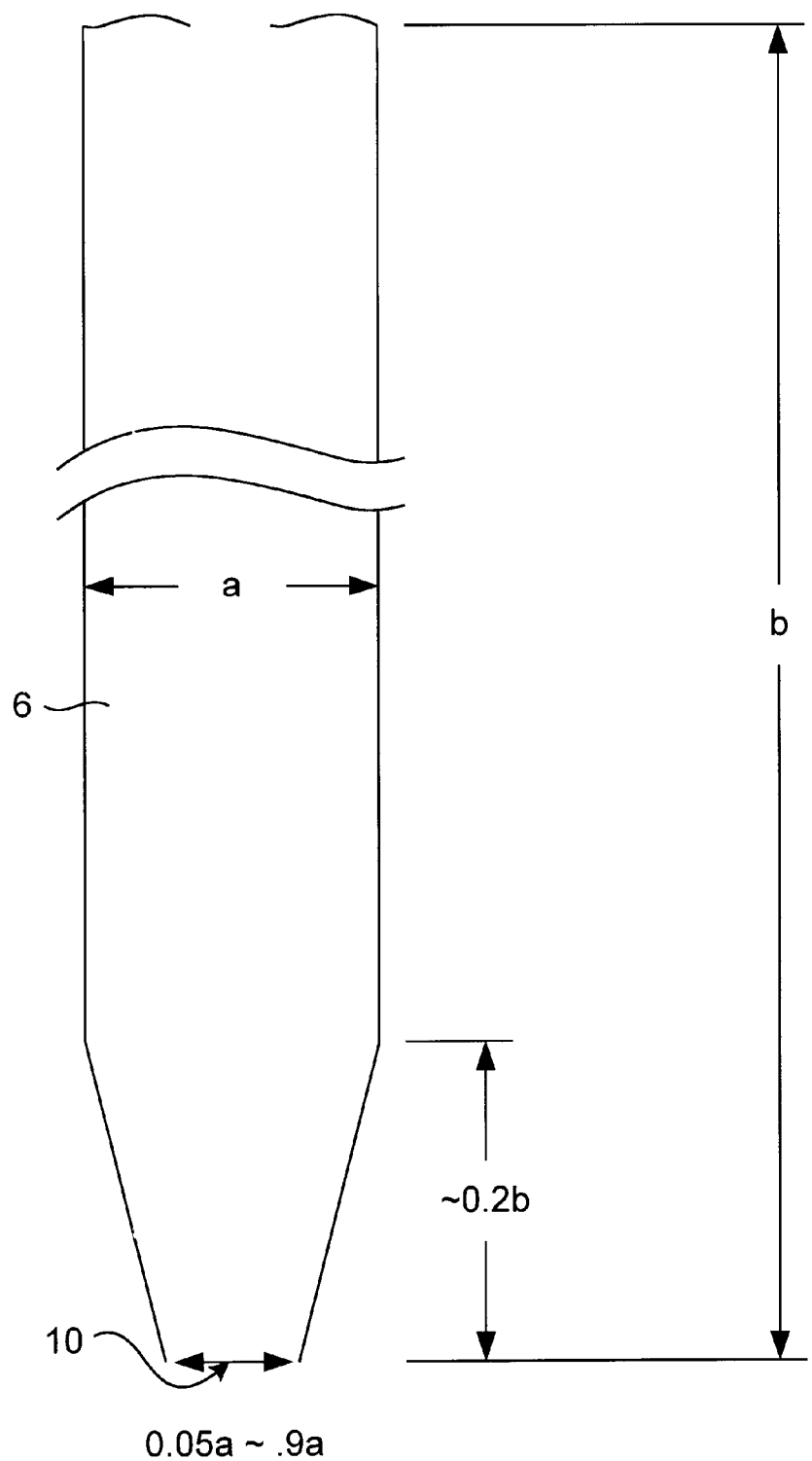
FIG. 3 is a side view showing an example of an end portion of the gas feed tube of the liquid level sensor according to the present invention.

For example, the end portion of the gas feed tube can be tapered as shown in FIG. 3. In this example, the gas feed tube 6 has a tapered end portion. In this case, the diameter of the gas outlet 10 at the end of the feed tube 6 relative to the inner diameter a of the feed tube 6 may be defined within the range of 0.05a to 0.9a, more preferably 0.1a to 0.8a, most preferably 0.4a to 0.7a. Generally, the diameter of the gas outlet 10 at the end of the feed tube 6 should be not be so small relative to the inner diameter of the feed tube 6 that a pressure contribution to liquid level cannot be exactly measured because the decreased diameter of the outlet increases gas pressure. Also the gas outlet 10 at end of the feed tube 6 should not be so large relative to the inner diameter of the feed tube 6 that deposition of ammonium fluoride cannot be prevented because the diameter of the outlet becomes almost comparable to the inner diameter of the gas feed tube.

In a preferred embodiment, the tapered end portion of the feed tube 6 relative to the tube length b may be defined at 0.2b or below. Generally, the tapered portion should not be so long that it becomes difficult to exactly measure a pressure contribution to liquid level because pressure loss occurs due to an increase of resistance in the taped portion.

Figure 4:
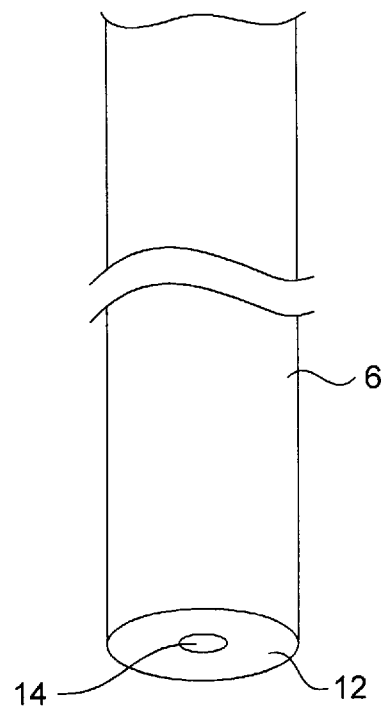
FIG. 4 is a perspective view showing another example of an end portion of the gas feed tube of the liquid level sensor according to the present invention.

As an alternative shape of the end portion of the gas feed tube 6, a concentric outlet 14 having a diameter smaller than the inner diameter of the tube 6 may be formed at a closed end face 12 of the gas feed tube 6, as shown in FIG. 4. In this case the end taper portion is zero.

Figure 5:
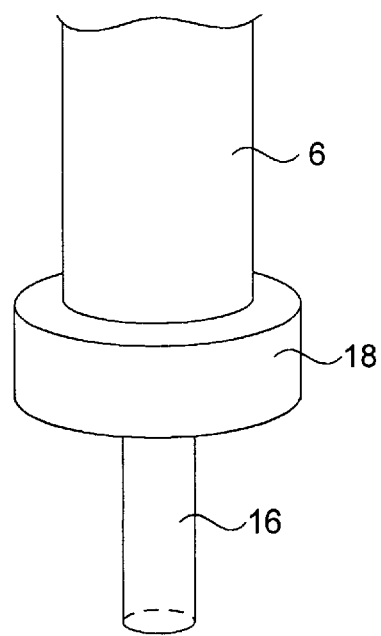
FIG. 5 is a perspective view showing still another example of an end portion of the gas feed tube of the liquid level sensor according to the present invention.

As still another example, a gas outlet tube 16 having a diameter smaller than the diameter of the gas feed tube 6 may be connected to an end portion of the tube with a fitting 18, as shown in FIG. 5.

Figure 6:
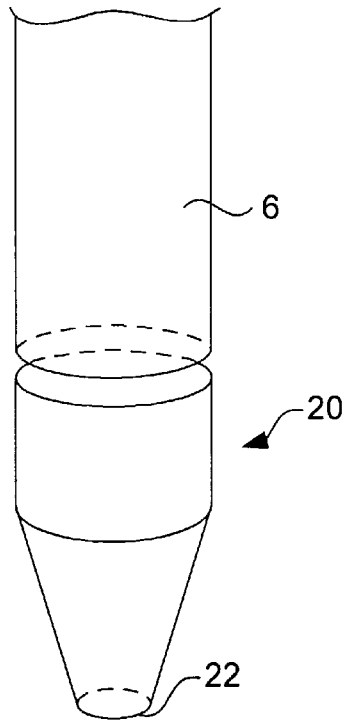
FIG. 6 is a perspective view showing an example of an end fitting to the end portion of the gas feed tube of the liquid level sensor according to the present invention.
Figure 7:
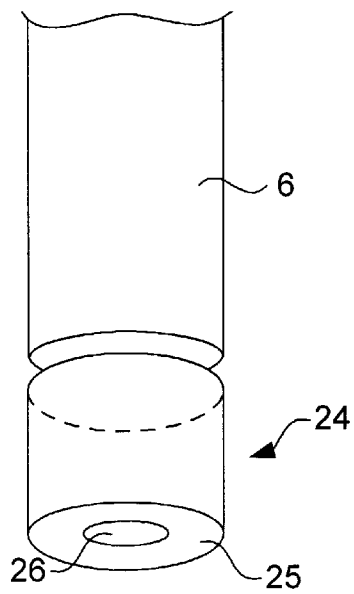
FIG. 7 is a perspective view showing another example of an end fitting to the end portion of the gas feed tube of the liquid level sensor according to the present invention.

Similarly, a tapered end fitting 20 having an outlet 22 or an end fitting 24 having an outlet 26 at an end face 25 may be fitted at an end of the gas feed tube 6 as shown in FIGS. 6 and 7, respectively.

These gas feed tubes 6, gas outlet tubes 16 and end fittings 20, 24 may be made, for example, from Teflon, vinyl chloride, SUS or polypropylene, etc.

A liquid level sensor according to the present invention cannot erroneously operate by deposition of ammonium fluoride, because the diameter of the gas outlet at an end of the gas feed tube is smaller than the inner diameter of the gas feed tube to restrain buffered hydrofluoric acid from depositing on the inner wall of the tube from liquid splash or the like. Therefore, no shutdown occurs by erroneous operation to improve the throughput of the production line. Moreover, no more chemical solutions need to be discharged from the chemical solution bath after erroneous operation, thus reducing costs of the chemical solutions.

EXAMPLES

The following examples provide details of specific implementations to assist in the understanding of the present invention. It should be understood the following is representative only, and that the invention is not limited by the details set forth in these examples.

Figure 8:
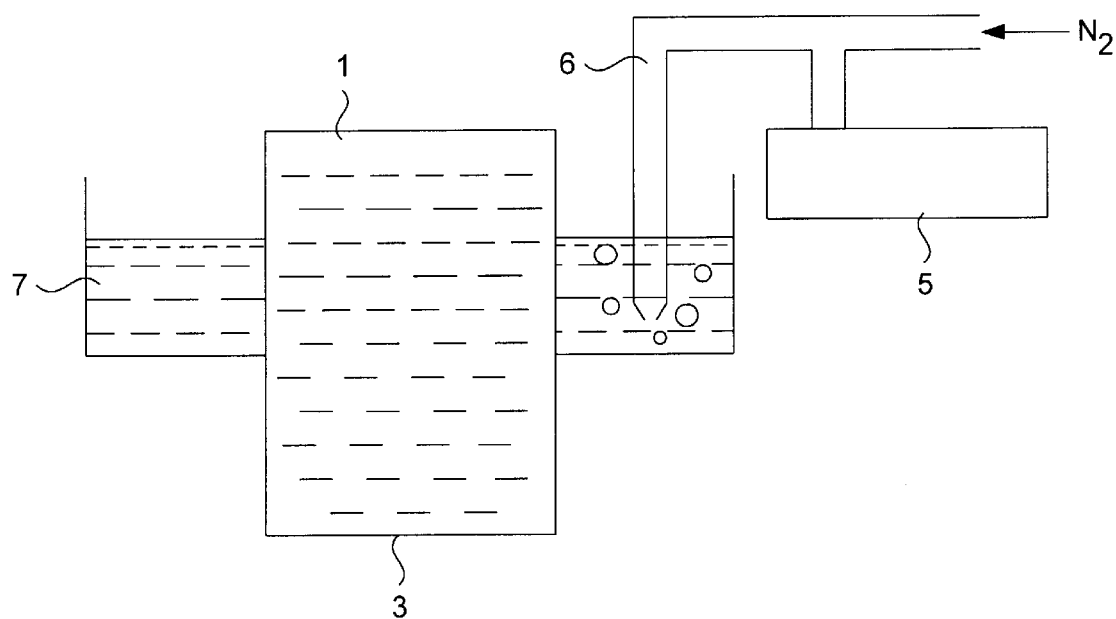
FIG. 8 is a schematic view showing an example of the liquid level sensor according to the present invention.

FIG. 8 shows an example of the liquid level sensor for buffered hydrofluoric acid according to the present invention. This liquid level sensor comprises a chemical solution bath 3 equipped with a surrounding outer bath 7 for receiving a chemical solution 1 including buffered hydrofluoric acid, a gas feed tube 6 for introducing $N_2$ gas for detecting the liquid level of said chemical solution into said chemical solution 1, and a sensor 5 for detecting a change in the pressure of said gas and converting it into an electric signal to indicate a change in liquid level, wherein an end portion of the gas feed tube 6 is tapered as shown in FIG. 3.

An experiment was performers using this liquid level sensor under the following experimental conditions:

Gas feed tube 6 made from Teflon having an inner diameter of 5 mm, with a gas outlet 10 having a diameter of 3 mm, a tube length b of 25 cm and a tapered portion of 3 cm;

Chemical solution: surfactant-added buffered hydrofluoric acid ($HF:NH_4F=1:100$, 24° C.);

Gas: high-purity $N_2$ ($N_2$ flow rate: 50±5 cc/min, $N_2$ pressure: 0.20 $kg/cm^2$).

The same experiment was performed using a comparative gas feed tube having a uniform diameter that the diameter of a gas feed tube is equal to that of a gas outlet.

The comparative liquid level sensor with the gas feed tube having a uniform diameter erroneously triggered an alarm indicative of a rise in liquid level due to deposition of ammonium fluoride around 3000 minutes, while the sensor according to the present invention did not trigger any alarm even after the lapse of 9999 minutes. In each of several tens of runs of the experiment, buffered hydrofluoric acid could be used for 9999 minutes or more.

These experiments demonstrated that the sensor with a gas feed tube 6 having a reduced-diameter end in accordance with the present invention never erroneously operated by deposition of ammonium fluoride.

Although the foregoing invention has been described in some detail for purposes of clarity of understanding, it will be apparent that certain changes and modifications may be practiced within the scope of the appended claims. It should be noted that there are many alternative ways of implementing both the process and apparatuses of the present invention. Accordingly, the present embodiments are to be considered as illustrative and not restrictive, and the invention is not to be limited to the details given herein, but may be modified within the scope and equivalents of the appended claims.

What is claimed is:

1. A liquid level sensor for buffered hydrofluoric acids, comprising a chemical solution bath for receiving a chemical solution including buffered hydrofluoric acid, a gas feed tube for introducing a gas for detecting the variation in the liquid level of said chemical solution into said chemical solution, said gas feed tube having an inner diameter, and a gas pressure detector for detecting a change in the pressure of said gas and converting it into an electric signal to indicate a change in liquid level, characterized in that the inner diameter of said gas feed tube is larger than an inner diameter of a gas outlet provided at an end of said gas feed tube.

2. A liquid level sensor in accordance with claim 1, wherein said gas feed tube has a tapered end portion.

3. A liquid level sensor in accordance with claim 2, wherein said end portion has a diameter at the gas outlet defined relative to the inner diameter a of the feed tube within the range of 0.05a to 0.9a.

4. A liquid level sensor in accordance with claim 3, wherein said end portion has a diameter at the gas outlet defined relative to the inner diameter a of the feed tube within the range of 0.1a to 0.8a.

5. A liquid level sensor in accordance with claim 4, wherein said end portion has a diameter at the gas outlet defined relative to the inner diameter a of the feed tube within the range of 0.4a to 0.7a.

6. A liquid level sensor in accordance with claim 2, wherein said gas feed tube has an inner diameter of 5 mm, said gas outlet has a diameter of 3 mm, said gas feed tube has a length of 25 cm, and said tapered end portion has a length of of 3 cm.

7. A liquid level sensor in accordance with claim 1, wherein the diameter of the gas outlet at the end of the feed tube is not so small relative to the inner diameter of the feed tube that a pressure contribution to liquid level cannot be exactly measured because the decreased diameter of the outlet increases gas pressure, and the gas outlet at the end of the feed tube is not so large relative to the inner diameter of the feed tube that deposition of ammonium fluoride cannot be prevented because the diameter of the outlet becomes almost comparable to the inner diameter of the feed tube.

8. A liquid level sensor in accordance with claim 2, wherein said tapered end portion of the feed tube relative to the tube length b may be defined at 0.2b or below.

9. A liquid level sensor in accordance with claim 1, wherein said end portion of the gas feed tube comprises a concentric outlet having a diameter smaller than the inner diameter of the gas feed tube.

10. A liquid level sensor in accordance with claim 1, wherein said end portion of the gas feed tube is connected to the gas feed tube with a fitting.

11. A liquid level sensor in accordance with claim 10, wherein said gas feed tube, gas outlet tube and end fitting are made from a material selected from Teflon, vinyl chloride, SUS and polypropylene.

* * * * *